Patented June 30, 1953

2,643,988

UNITED STATES PATENT OFFICE 2,643,988

HEAT-STABILIZED POLYCHLOROTRIFLUOROETHYLENE RESINS

Andrew T. Walter, South Charleston, W. Va., assignor to Union Carbide and Carbon Corporation, a corporation of New York No Drawing. Application October 12, 1951,
Serial No. 251,149

11 Claims. (Cl. 260—45.7)

This application relates to an improvement in polychlorotrifluoroethylene resins. More particularly it is concerned with the stabilization of such resins at temperatures required for molding or extruding operations by dispersing intimately therein certain inorganic compounds, as for instance a metal salt of an oxygen acid of chlorine.

Polychlorotrifluoroethylene is a crystalline polymer melting at about 205° C. Its melting point is rather sharp, and similar in kind to that of polyethylene at 115° C. Its viscosity at temperatures above its melting point is high. For instance, the numerical expression of the melt-viscosity of a grade preferred for injection-molding is approximately twenty-five times as great as that of the melt-viscosity of a commercial grade of polyethylene commonly used for extrusion and molding operations (sold under the trade name "Bakelite" polyethylene DYNH) at temperatures which are approximately 25° C. above their respective melting points. Also, the comparatively gradual decrease in viscosity with increase in temperature which is a characteristic of polyethylene is also observed with polychlorotrifluoroethylene. Were it possible to take melt-viscosity alone as the index of suitable performance of the resin for molding and extrusion operations the temperature that would be required to render a polychlorotrifluoroethylene resin equivalent to polyethylene at 150° C. would be about 360° C. (extrapolated). Furthermore, under high shearing forces, hot polychlorotrifluoroethylene has a tendency to crumble rather than flow, a tendency attributable to low intermolecular cohesion.

Because of these and other characteristics, the temperatures used in processing polychlorotrifluoroethylene, as by injection molding extrusion or the like are necessarily high. The operating temperature of the high order that is required falls within the temperature region in which breakdown in vacuum of all vinyl and diene polymers to gaseous materials within a short time has been observed. According to Research Paper RR-1938; National Bureau of Standards (L. A. Wall), complete decomposition of such a polymer within a short time is observed at 400° C. Mass spectrometer analyses, made in connection with the present improvement, of gases evolved at elevated temperatures from a polychlorotrifluoroethylene resin indicate that the degradation from the polymer to the chlorotrifluoroethylene monomer, although very small, is measurable at temperatures between 250° and 300° C. Above 300° C., the analyses also indicate, the rate of decomposition increases rapidly, and at about 375° C. the rate is so rapid that decomposition can be accomplished almost quantitatively in thirty minutes. Weight loss measurements, also made in connection with my improvement, have shown that at temperatures of 300° C. and 325° C. in open crucibles, fifty per cent of the polychlorotrifluorethylene resin is lost within fifty-seven and twelve hours, respectively; and that at temperatures of 340° to 350° C. the weight loss during the first hour of heating is extremely high. Although this loss in weight might be attributable in part to the evaporation of resin of low molecular weight, the seriousness of the depolymerization tendency is pointed up by the tests, nevertheless.

Melt-viscosity determinations on specimens which have been aged for varying lengths of time at temperatures ranging from 250° to 330° C. also provide a useful index of polymer breakdown. The method for determining melt-viscosity used herein is that described by G. J. Dienes and H. F. Klemm in the Journal of Applied Physics for June 1946 (vol. 17, No. 6, pp. 458-471). Upon being subjected to temperatures above 330° C. the melt-viscosity, at 230° C., of even the most stable polymer samples falls below 0.05 megapoise within a short time. A resin having a melt-viscosity at 230° C. of 0.05 megapoise or less is very weak and can easily be broken by hand, and at melt-viscosities of about 0.5 megapoise the increase in brittleness and the decrease in ultimate elongation is substantial. Typical data on the relationship of physical properties and melt-viscosities at 230° C. are given in the following table:

TABLE I

*Comparison of melt-viscosities and physical properties of polychlorotrifluoroethylene*

| Sample No. | 230° C. Melt Viscosity, Megapoises | Tensile Strength, p. s. i. | Ultimate Elongation, Percent | Brittle Temperatures, ° C. |
|---|---|---|---|---|
| 1 | 44 | 5,000 | 120 | +15 |
| 2 | 16 | 5,710 | 129 | +10 |
| 3 | 5.2 | 5,590 | 58 | +14 |
| 4 | 1.9 | 5,700 | 75 | +27 |
| 5 | 0.15 | 5,150 | <10 | +40 |

NOTE.—A possible non-uniform crystallinity in the molded test specimens may be reflected in certain of the above values. For instance, Sample No. 1 (melt-viscosity, 44) seemingly should have shown a tensile strength and elongation as great as that obtained with Sample No. 2 (melt-viscosity, 16), and a brittle temperature no higher than that of Sample No. 2. Similarly, Sample No. 3 (melt-viscosity, seemingly should have shown a tensile strength and elongation greater than that of Sample No. 4 (melt-viscosity, 1.9)).

My improvement is based upon the discovery that polychlorotrifluoroethylene can be stabilized by intimately dispersing therein a small amount of a metal salt of an oxyacid of chlorine in which the metals are lithium, sodium and potassium of group 1 and beryllium and magnesium of group 2 of the periodic classification of the elements, having atomic numbers from three to nineteen, inclusive. The salts include the hypochlorites, the chlorites, the chlorates and the perchlorates of these metals. From about 0.01 part to 2.5 parts of salt per 100 parts of resin is useful for my improvement. Larger amounts may be used, if desired, but no added advantage results from the use of more than 2.5 parts per 100 parts of resin. An amount which is about 0.01 to 0.1 part per 100 parts of resin is preferred.

The salt can be dispersed in the resin by any suitable expedient. For instance, the resin and the salt can be dry-mixed or blended in powder form as by finely pulverizing the resin and the salt separately to pass a 100-mesh screen and then intimately mixing and blending them in a suitable mixer or blender. Good distribution of the salt stabilizer can be obtained also by first dissolving in a suitable solvent, for instance, a mixture of isopropanol, 80 parts, and water, 20 parts, and then tumbling the powdered resin with an amount of solution to give the desired salt content. When a salt solution is used, care should be taken to evaporate the solvent slowly to prevent migration of the salt in the final drying of the resin.

In addition to the foregoing metal salts which are preferred, the barium, calcium, strontium, copper, zinc, silver, cadmium, caesium, gold and mercury salts of the oxyacids of chlorine can also be used with good results.

Polychlorotrifluoroethylene resins stabilized by a salt intimately dispersed therein in accordance with my discovery can be extruded, molded or the like at temperatures required for such operation without substantial deterioration or loss of essential properties.

The improvement is further illustrated by the following examples:

EXAMPLE 1

A polychlorotrifluoroethylene resin having an initial melt-viscosity of 18 megapoises at a temperature of 230° C. was pulverized to a fine particle size to pass a 100-mesh screen. The finely divided resin was then tumbled with an isopropanol-water (80-20) solution of a salt stabilizer in an amount sufficient to provide the desired concentration of the salt in the resin, and the solvent then evaporated slowly. The salts were sodium hypochlorite, NaClO; magnesium perchlorate, $Mg(ClO_4)_2$; and sodium chlorate, $NaClO_3$. For instance, to obtain a resin containing 0.1 per cent of stabilizer, ten parts of the resin were tumbled in admixture with one part of a solution containing one part of the salt dissolved in a mixture of isopropanol, 80 parts, and water, 20 parts, all by weight.

Ten gram specimens were heated in unsealed glass tubes for a period of one hour at a temperature of 300° C. and then molded in a positive-pressure disc mold heated at a temperature of 250° C. for five minutes to form discs 1.5 inches by ⅛ inch thick. Test discs having a diameter of ⅝ inch were then cut from the molded discs and the melt-viscosities determined. The results are set forth in the following table:

| Stabilizer | Percent | Melt-Viscosity at 230° C.,[1] Megapoises | Viscosity Retained,[1] Percent | Color [1] |
|---|---|---|---|---|
| NaClO | 0.1 | 1.8 | 10.0 | Colorless. |
| $Mg(ClO_4)_2$ | 0.1 | 7.4 | 41.1 | Do. |
| $Mg(ClO_4)_2$ | 0.2 | 8.1 | 45.0 | Do. |
| $NaClO_3$ | 0.1 | 7.1 | 39.4 | Do. |

[1] After degradation by heating at 300° C. for one hour.

Unstabilized specimens under the same conditions turned brown in color and had a melt-viscosity at 230° C. of 0.12 megapoise, only 0.67 per cent of its original viscosity.

EXAMPLE 2

A polychlorotrifluoroethylene resin having an initial melt-viscosity of 9.7 megapoises at a temperature of 230° C. was finely pulverized to pass a 100-mesh screen, the pulverized resin then tumbled with an isopropanol-water solution of a stabilizer salt, and the solvent evaporated slowly as in Example 1. The salts were sodium chlorite, $NaClO_2$, and sodium chlorate, $NaClO_3$.

Also, as in Example 1, ten gram specimens of the resin were then heated in unsealed glass tubes for a period of one hour at a temperature of 300° C. The specimens were then molded under pressure into discs and the molded discs cut into test discs, ⅝ inch by ⅛ inch. The mold was heated at a temperature of 250° C. for a period of five minutes. The melt-viscosity of the resin specimens was then determined. The results are given in the following table:

| Stabilizer | Percent | Melt-Viscosity at 230° C.,[1] Megapoises | Viscosity Retained,[1] Percent | Color [1] |
|---|---|---|---|---|
| $NaClO_2$ | 0.2 | 0.92 | 9.48 | Colorless. |
| $NaClO_3$ | 0.1 | 1.6-2.0 | 16.8-20.6 | Do. |

[1] After degradation by heating at 300° C. for one hour.

By way of comparison, an unstabilized specimen of the same resin after heating for one hour at 300° C. was dark in color and had a melt-viscosity of only 0.05 megapoise, which is but 0.52 per cent of its initial melt-viscosity.

EXAMPLE 3

A polychlorotrifluoroethylene resin having an initial melt-viscosity of 55.5 megapoises at a temperature of 230° C. was finely pulverized to pass a 100-mesh screen, and the pulverized resin then tumbled with a stabilizer salt dissolved in an isopropanol-water (80-20) solvent with evaporation of the solvent being carried out slowly. The salts were magnesium perchlorate, $Mg(ClO_4)_2$, and sodium chlorate, $NaClO_3$.

Ten gram specimens of the resin were heated in unsealed glass tubes at a temperature of 300° C. for a period of one hour, and then molded in a mold heated to a temperature of 250° C. for a period of five minutes and cut, as before, into test discs, ⅝ inch by ⅛ inch. The melt-viscosity if the specimens was then determined with the following results:

| Stabilizer | Percent | Melt-Viscosity at 230° C.,[1] Megapoises | Viscosity Retained,[1] Percent | Color[1] |
|---|---|---|---|---|
| Mg(ClO₄)₂ | 0.1 | 35.5 | 63.96 | Colorless. |
| Mg(ClO₄)₂ | 0.2 | 34.2 | 61.62 | Do. |
| NaClO₃ | 0.1 | 36.6 | 65.95 | Do. |

[1] After degradation by heating at 300° C. for one hour.

In contrast to the foregoing, an unstabilized specimen of the same resin although clear in color after heating for one hour at 300° C. had a melt-viscosity of 12.7 megapoises, or 22.9 per cent of its initial melt-viscosity.

EXAMPLE 4

A polychlorotrifluoroethylene resin having an initial melt-viscosity at a temperature of 230° C. of 18 megapoises was pulverized to a fine particle size to pass a 100-mesh screen. The pulverized resin was tumbled with an isopropanol-water solution of sodium hypochlorite, NaClO, in the ratio of one part of solution to ten parts of resin. The solution contained one part of the salt in a mixture of 80 parts isopropanol and 20 parts of water. The solvent was evaporated slowly.

This resin was then heated in a thin layer for a period of four hours in a circulating air oven maintained at a temperature of about 190° C.

Thereafter, ten gram specimens of the resin were heated in unsealed glass tubes for a period of one hour at a temperature of 300° C., and then molded in a mold heated at a temperature of 250° C. for five minutes and cut into test discs, ⅝ inch by ⅛ inch. The stabilized resin remained colorless and was found to have a melt-viscosity at 230° C. of 4.5 megapoises, which is 25 per cent of the initial melt-viscosity of the resin.

In contrast thereto, an unstabilized specimen heated for a period of one hour at a temperature of 300° C. and then molded in a mold heated at a temperature of 250° C. for a period of five minutes turned brown in color and was found to have a melt-viscosity at 230° C. of only 0.12 megapoise, corresponding to 0.67 per cent of its initial melt-viscosity.

EXAMPLE 5

A polychlorotrifluoroethylene resin having an initial melt-viscosity at 230° C. of 9.7 megapoises was pulverized to a fine particle size to pass a 100-mesh screen. The pulverized resin was tumbled with isopropanol-water (80–20) solutions of sodium chlorite, NaClO₂, in the ratio of one part of solution to ten parts of resin. The solutions contained 0.5 part and 1.0 part, respectively, of sodium chlorite per 100 parts of solvent. The solvent was evaporated slowly.

The stabilized resins were then heated, each in a thin layer, for a period of four hours in a circulating air oven maintained at a temperature of 180° C.

Thereafter, ten gram specimens of the resins were heated in unsealed glass tubes for a period of one hour at a temperature of 300° C., and then molded in a mold heated at a temperature of 250° C. for five minutes and cut into test discs, ⅝ inch by ⅛ inch. The melt-viscosities were then determined with the following results:

| Stabilizer | Percent | Melt-Viscosity at 230° C.,[1] Megapoises | Viscosity Retained,[1] Percent | Color[1] |
|---|---|---|---|---|
| NaClO₂ | 0.1 | 8.0 | 82.47 | Colorless. |
| NaClO₂ | 0.05 | 0.46 | 4.74 | Do. |

[1] After degradation by heating at 300° C. for one hour.

These results are to be compared with an unstabilized specimen which, on heating at 300° C. for a period of one hour, and then molded in a mold heated at a temperature of 250° C. for five minutes, turned dark in color and had a melt-viscosity at 230° C. of 0.5 megapoise, corresponding to 0.52 per cent of its initial melt-viscosity.

EXAMPLE 6

A polychlorotrifluoroethylene resin having an initial melt-viscosity at a temperature of 230° C. of 43.8 megapoises was pulverized to a fine particle size to pass a 100-mesh screen. The pulverized resin was tumbled with an isopropanol-water (80–20) solution of lithium chlorate, LiClO₃, in the ratio of one part of the solution per ten parts of resin. The solution contained one part of lithium chlorate per 100 parts of solvent. The solvent was evaporated slowly.

The stabilized resin was then heated in a thin layer for a period of four hours in a circulating air oven maintained at a temperature of 200° C.

Thereafter, ten gram specimens of the resin were heated in unsealed glass tubes for a period of one hour at a temperature of 300° C., and then molded in a mold heated at a temperature of 250° C. for five minutes and cut into test discs, ⅝ inch by ⅛ inch. The stabilized resin remained colorless and was found to have a melt-viscosity at 230° C. of 16.5 megapoises, corresponding to 37.67 per cent of the initial melt-viscosity.

By way of comparison, an unstabilized specimen of the resin, on heating at 300° C. for a period of one hour and then molded in a mold heated at a temperature of 250° C. for five minutes, turned dark amber in color and had a melt-viscosity at 230° C. of 0.18 megapoise, corresponding to 0.41 per cent of its initial melt-viscosity.

EXAMPLE 7

A polychlorotrifluoroethylene resin having an initial melt-viscosity at a temperature of 230° C. of 21.0 megapoises was pulverized to a fine particle size to pass a 100-mesh screen. The pulverized resin was blended in a double cone blender with silver fluoride, AgF, in the ratio of 0.1 part of the silver fluoride per 100 parts of the resin.

The resin was then heated in a thin layer for a period of four hours in a circulating air oven maintained at a temperature of about 200° C.

Thereafter, ten gram specimens of the resin were heated in unsealed glass tubes for a period of one hour at a temperature of 300° C., and then molded in a mold heated at a temperature of 250° C. for five minutes and cut into test discs, ⅝ inch by ⅛ inch. The stabilized resin remained unchanged in color and was found to have a melt-viscosity at 230° C. of 14.6 megapoises, corresponding to 69.52 per cent of the initial melt-viscosity of the resin.

By way of comparison, an unstabilized specimen of the resin, on heating at 300° C. for a period of one hour and then molding in a mold heated at a temperature of 250° C. for five minutes, turned dark amber in color and had a melt-viscosity at 230° C. of 0.17 megapoise, corresponding to 0.81 per cent of the initial melt-viscosity.

EXAMPLE 8

A polychlorotrifluoroethylene resin having an initial melt-viscosity at a temperature of 230° C. of 25.9 megapoises was pulverized to a fine particle size to pass a 100-mesh screen. The pulverized resin was blended in a double cone blender with sodium chlorate, $NaClO_3$, in the ratio of 0.1 part of sodium chlorate per 100 parts of the resin.

The resin was then heated in a thin layer for a period of four hours in a circulating air oven maintained at a temperature of about 200° C.

Thereafter, 10 gram specimens of the resin were heated in unsealed glass tubes for a period of one hour at a temperature of 300° C., and then molded in a mold heated at a temperature of 250° C. for five minutes and cut into test discs, ⅝ inch by ⅛ inch. The stabilized resin remained colorless and was found to have a melt-viscosity at 230° C. of 14.3 megapoises, corresponding to 55.21 per cent of the initial melt-viscosity.

An unstabilized specimen of the same resin, on heating at 300° C. for a period of one hour and molding in a mold heated at a temperature of 250° C. for five minutes turned light amber in color and had a melt-viscosity at 230° C. of 2.56 megapoises, corresponding to 9.88 per cent of the initial melt-viscosity. The same resin upon being subjected to the blending operation without the addition of salt, and then heated in a thin layer for a period of four hours in a circulating air oven at a temperature of about 200° C., precisely as in the case of the salt-stabilized resin, had a melt-viscosity at 230° C. of 2.8 megapoises, or 10.81 per cent of its initial melt-viscosity, although it did remain clear in color.

EXAMPLE 9

A number of tests were run in which various salts were incorporated into a polychlorotrifluoroethylene resin having a melt-viscosity of 16.9 megapoises at 230° C. The salts were incorporated by the slurry method as described in Example 1. The amount of salt used in each case was 0.1 part per 100 parts of the resin, except in the case of the control where none was used.

The melt-viscosities at 230° C. both before aging and after aging at a temperature of 300° C. for a period of one hour were determined for the stabilized and unstabilized specimens with the following results:

| Stabilizer Salt | Melt-Viscosity, Megapoises, at 230° C. | |
|---|---|---|
| | Before Aging | After aging at 300° C. for 1 hour |
| None (control) | 16.9 | 0.52 |
| Barium chlorate, $Ba(ClO_3)_2$ | 16.9 | 9.4 |
| Calcium chlorate, $Ca(ClO_3)_2$ | 16.9 | 3.4 |
| Magnesium chlorate, $Mg(ClO_3)_2$ | 16.9 | 9.7 |
| Strontium chlorate, $Sr(ClO_3)_2$ | 16.9 | 10.8 |
| Sodium chlorate, $NaClO_3$ | 16.9 | 8.6 |
| Lithium chlorate, $LiClO_3$ | 16.9 | 9.8 |

EXAMPLE 10

A number of tests similar to those described in Example 9 were run on a polychlorotrifluoroethylene resin having a melt-viscosity at 230° C. of 57.2 megapoises. The results were as follows:

| Stabilizer Salt [1] | Melt-Viscosity, Megapoises, at 230° C. | |
|---|---|---|
| | Before Aging | After aging at 300° C. for 1 hour |
| None (control) | 57.2 | 15.9 |
| Barium chlorate, $Ba(ClO_3)_2$ | 57.2 | 39.0 |
| Calcium chlorate, $Ca(ClO_3)_2$ | 57.2 | 16.7 |
| Magnesium chlorate, $Mg(ClO_3)_2$ | 57.2 | 29.0 |
| Strontium chlorate, $Sr(ClO_3)_2$ | 57.2 | 38.3 |
| Sodium chlorate, $NaClO_3$ | 57.2 | 16.3 |

[1] 0.1 part per 100 parts of resin.

EXAMPLE 11

A polychlorotrifluoroethylene resin was stabilized with 0.1 part of sodium chlorate, $NaClO_3$, per 100 parts of resin by the slurry method as described in Example 1 and then dried at a temperature of 200° C. for five hours.

Injection-molded specimens were then made of both the stabilized and unstabilized resin by an injection-molding operation carried out in a one-ounce "Van Dorn" injection-molding machine at a cylinder temperature of about 288° to 315° C. (550° to 600° F.).

The specimens molded from the stabilized resin were perfectly colorless, of good strength, and the stabilized resin after this injection-molding operation had a melt-viscosity at 230° C. of 17.5 megapoises.

By way of contrast the specimens molded from the unstabilized resin were amber-colored, of poor strength, and the unstabilized resin after this injection molding operation had a melt-viscosity at 230° C. of 0.96 megapoise.

EXAMPLE 12

A part of the stabilized resin of Example 11 was extruded in a standard No. ½ Royle extruder at a temperature of about 315° C. (600° F.) to form a rod. The rod was perfectly colorless, and the stabilized material of the rod, after the extrusion operation had a melt-viscosity at 230° C. of 11.3 megapoises.

EXAMPLE 13

A number of extrusion operations to form rods were carried out on different lots of polychlorotrifluoroethylene resin which had been stabilized with 0.1 part of sodium chlorate per 100 parts of resin by the slurry method as described in Examples 1 and 11. On one lot of resin thus stabilized the melt-viscosities at 230° C. before and after extrusion were 39.4 and 3.1 megapoises, respectively; on another lot 18.2 and 12.7 megapoises, respectively. The rods in each instance were rated as excellent in freedom from color.

In contrast to the foregoing, similar extrusion operations on lots of unstabilized resin resulted in a reduction of melt-viscosity at 230° C. from 48 megapoises, before extrusion, to 1.8 megapoises after extrusion in one instance, and from 17 megapoises before extrusion, to 2.6 megapoises after extrusion in another instance. An amber color was developed in the unstabilized resin in both instances, by the extrusion.

EXAMPLE 14

To a number of 50-gram samples of powdered polychlorotrifluoroethylene resin, having a melt-viscosity at 230° C. of 36 megapoises, were added differing amounts of sodium chlorate as stabilizers. The manner of adding the stabilizer was similar to that described in Example 1. The various stabilizer samples were then heat-treated in powder form for a period of five hours at a temperature of 190° C.

Thereafter, the heat-treated resin samples were tested for stability by heating them in a steel mold for a period of 15 minutes at a temperature of 300° C. The results were as follows:

| Stabilizer, Percent | Melt-Viscosity at 230° C. after heating at 300° C. for 15 minutes; Megapoises | Color after Heating |
|---|---|---|
| 0.01 | 8.9 | Slightly discolored. |
| 0.02 | 11.6 | Very slightly discolored. |
| 0.04 | 16.0 | Colorless. |
| 0.06 | 19.6 | Do. |
| 0.08 | 18.0 | Do. |
| 0.10 | 21.0 | Do. |

In contrast to the foregoing, an unstabilized sample after being subjected to the same test gave a melt-viscosity of 3.75 and had turned amber in color.

EXAMPLE 15

To a number of samples of dry powdered polychlorotrifluoroethylene resin, having a melt-viscosity at 230° C. of 10.9 megapoises, were added differing amounts of sodium chlorate stabilizer. The stabilizer was added in the form of an isopropyl alcohol-water solution (80 parts isopropyl alcohol-20 parts water), and the solvent evaporated slowly. The resin-stabilizer composition was then cold-pressed into tablets, $\frac{3}{16}$ inch thick by 1¼ inches diameter, and heat-treated for a period of five hours at a temperature of 200° C. The material was then granulated to a particle size of approximately $\frac{1}{16}$ inch. The heat stability of the material was then tested by aging it in a mold for a period of one hour at a temperature of 300° C. and also by extruding a large portion of the samples under conditions employed for coating wire. The results were as follows:

| Stabilizer, Percent | Melt-Viscosity at 230° C. after heating at 300° C. for one hour; Megapoises | Color After Heating | Color After Extrusion |
|---|---|---|---|
| 0.01 | 2.2 | Light Brown | Light Brown. |
| 0.02 | 4.4 | do | Do. |
| 0.03 | 2.0 | Colorless | Colorless. |
| 0.04 | 4.4 | do | Do. |

No bubble formation was observed in the extruded material.

By way of comparison, the melt-viscosity at 230° C. of an unstabilized sample after the heating was found to be 0.85 megapoise. The color of the material both after the heating and the extrusion was a dark brown.

This application is in part a continuation of my co-pending application, filed May 16, 1950, Serial No. 162,393, for "Heat-Stabilized Polychlorotrifluoroethylene Resins."

What is claimed is:

1. A polychlorotrifluoroethylene resin stabilized against color development and degradation of melt-viscosity at molding temperatures by the presence intimately dispersed therein of about 0.01 to 2.5 parts per 100 parts of resin, by weight, of a metal salt of an oxyacid of chlorine, said metal being of the first two groups of metals of the periodic classification.

2. A polychlorotrifluoroethylene resin stabilized against color development and degradation of melt-viscosity at molding temperatures by the presence intimately dispersed therein of about 0.01 to 2.5 parts per 100 parts of resin, by weight, of a salt of the group consisting of silver fluoride and the alkali metal and alkaline earth metal salts of the oxyacids of chlorine.

3. A polychlorotrifluoroethylene resin stabilized against color development and degradation of melt-viscosity at molding temperatures by the presence intimately dispersed therein of about 0.01 to 2.5 parts per 100 parts of resin, by weight, of an alkali metal salt of an oxyacid of chlorine.

4. A polychlorotrifluoroethylene resin stabilized against color development and degradation of melt-viscosity at molding temperatures by the presence intimately dispersed therein of about 0.01 to 2.5 parts per 100 parts of resin, by weight, of a metal salt of an oxyacid of chlorine, said metal being of the first two groups of metals of the periodic classification and having an atomic number of not more than 19.

5. A polychlorotrifluoroethylene resin stabilized against color development and degradation of melt-viscosity at molding temperatures by the presence intimately dispersed therein of about 0.01 to 2.5 parts per 100 parts of the resin by weight of the sodium salt of an oxyacid of chlorine.

6. A polychlorotrifluoroethylene resin stabilized against color development and degradation of melt-viscosity at molding temperatures by the presence intimately dispersed therein of about 0.01 to 2.5 parts per 100 parts of the resin by weight of the potassium salt of an oxyacid of chlorine.

7. A polychlorotrifluoroethylene resin stabilized against color development and degradation of melt-viscosity at molding temperatures by the presence intimately dispersed therein of about 0.01 to 2.5 parts per 100 parts of the resin by weight of the magnesium salt of an oxyacid of chlorine.

8. A polychlorotrifluoroethylene resin stabilized against color development and degradation of melt-viscosity at molding temperatures by the presence intimately dispersed therein of about 0.01 to 2.5 parts per 100 parts of the resin by weight of the lithium salt of an oxyacid of chlorine.

9. A polychlorotrifluoroethylene resin stabilized against color development and degradation of melt-viscosity at molding temperatures by the presence intimately dispersed therein of about 0.01 to 2.5 parts per 100 parts of the resin by weight of the beryllium salt of an oxyacid of chlorine.

10. A polychlorotrifluoroethylene resin stabilized against color development and degradation of melt-viscosity at molding temperatures by the presence intimately dispersed therein of about 0.01 to 0.10 part per 100 parts of resin, by weight, of a metal salt of an oxyacid of chlorine, said metal being of the first two groups of metals of the periodic classification.

11. A polychlorotrifluoroethylene resin stabilized against color development and degradation of melt-viscosity at molding temperatures by the presence intimately dispersed therein of about 0.01 to 2.5 parts per 100 parts of resin, by weight, of an alkaline earth metal salt of an oxyacid of chlorine.

ANDREW T. WALTER.

No references cited.